US012777219B2

(12) United States Patent
Yang

(10) Patent No.: US 12,777,219 B2
(45) Date of Patent: Oct. 27, 2026

(54) CACHE CONTROL METHOD AND DEVICE

(71) Applicant: Lemon Inc., Grand Cayman (KY)

(72) Inventor: Yifan Yang, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/670,927

(22) Filed: May 22, 2024

(65) Prior Publication Data

US 2024/0397139 A1 Nov. 28, 2024

(30) Foreign Application Priority Data

May 22, 2023 (CN) ......................... 202310582228.5

(51) Int. Cl.
*H04N 21/433* (2011.01)
*G06F 3/04847* (2022.01)

(52) U.S. Cl.
CPC ..... *H04N 21/4331* (2013.01); *G06F 3/04847* (2013.01)

(58) Field of Classification Search
CPC ....... G06F 3/04; G06F 3/04847; H04N 21/43; H04N 21/4331; H04N 21/47217
USPC .......................................................... 725/116
See application file for complete search history.

(56) References Cited

U.S. PATENT DOCUMENTS 6,847,778 B1 * 1/2005 Vallone ................ H04N 9/8042 386/206
8,224,299 B2 * 7/2012 Kim .................. H03M 13/2915 455/456.2
10,313,762 B2 * 6/2019 Oh ..................... H04N 21/6587
2004/0014013 A1 * 1/2004 Diesel ................... H04L 63/083 434/350
2006/0020966 A1 * 1/2006 Poslinski ................. G09B 5/00 386/E5.07
2007/0133938 A1 * 6/2007 Park ................... H04N 21/4147 386/E5.042
2007/0143803 A1 * 6/2007 Lim ................... H04N 21/4882 725/89
2010/0262912 A1 * 10/2010 Cha .................... H04N 21/4325 715/838
2014/0105575 A1 * 4/2014 Nishikawa ........... H04N 21/472 386/241

* cited by examiner

*Primary Examiner* — Susan E. Hodges

(57) ABSTRACT

The present disclosure provides a cache control method and device, in relation to the technical field of computer software. The method includes: displaying a player interface of the multimedia stream; and displaying a cache control element of the multimedia stream in the player interface, wherein the cache control element is configured to control the cache progress of the multimedia stream. Embodiments of the present disclosure may display cache control elements in the player interface to allow users to flexibly cache according to actual needs, which can effectively reduce unnecessary cache and save network resources consumed by caching.

17 Claims, 4 Drawing Sheets

CACHE CONTROL METHOD AND DEVICE

CROSS-REFERENCE TO RELATED APPLICATION(S)

This application claims priority to Chinese Application No. 2023105822285 filed in May 22, 2023, the disclosures of which are incorporated herein by reference in their entities.

FIELD

Embodiments of the present disclosure generally relate to the technical field of computer software, and more specifically, to a cache control method and device.

BACKGROUND

Multimedia streams may comprise audio programs and video programs, and the play of multimedia streams depends on applications. For example, in an audio application, an audio player may be called to play an audio program. In a video application, a video player may be called to play a video program.

In the existing technology, the play process of multimedia streams may comprise: first, caching (can also be called preloading) a part of the data of the multimedia stream before playing the multimedia stream, and starting playing the multimedia stream; then, during the process of playing the multimedia stream, caching the remaining data of the multimedia stream to realize the complete play of the multimedia stream.

However, the above solution has the problem of high network resource consumption.

SUMMARY

Embodiments of the present disclosure provide a cache control method and device, which can reduce network resource consumption.

In accordance with a first aspect, an embodiment of the present disclosure provides a cache control method, comprising:

Presenting a player interface of a multimedia stream.

Displaying a cache control element of the multimedia stream in the player interface, wherein the cache control element is configured to control a cache progress of the multimedia stream.

In accordance with a second aspect, an embodiment of the present disclosure provides a cache control apparatus, comprising:

A player interface display module, configured to display a player interface of a multimedia stream;

A cache control element display module, configured to display the cache control element of the multimedia stream in the player interface, wherein the cache control element is configured to control a cache progress of the multimedia stream.

In accordance with a third aspect, an embodiment of the present disclosure provides an electronic device, comprising: at least one processor and memory.

The memory stores computer executable instructions.

The at least one processor executes the computer executable instructions stored in the memory, causing the electronic device to perform the method of the first aspect.

In accordance with a fourth aspect, an embodiment of the present disclosure provides a non-transitory computer-readable storage medium, wherein the non-transitory computer-readable storage medium stores computer executable instructions, and when a processor executes the computer executable instructions, cause a computing device to perform the method of the first aspect.

In accordance with a fifth aspect, an embodiment of the present disclosure provides a computer program, wherein the computer program is configured to implement the method of the first aspect.

Embodiments of the present disclosure provide a cache control method and device. The method comprises: presenting a player interface of the multimedia stream; and displaying a cache control element of the multimedia stream in the player interface, wherein the cache control element is configured to control the cache progress of the multimedia stream. Embodiments of the present disclosure can display cache control elements in the player interface to allow users to flexibly cache according to actual needs, which can effectively reduce unnecessary cache and save network resources consumed by caching.

BRIEF DESCRIPTION OF THE DRAWINGS

In order to explain the embodiments of the present disclosure or the technical solutions in the prior art more clearly, the following will briefly introduce the drawings needed for describing the embodiments or the prior art. It will be apparent that the drawings in the following description are of some embodiments of the present disclosure. For those skilled in the art, other drawings can be derived from these drawings without exerting creative efforts.

DETAILED DESCRIPTION OF EMBODIMENTS

In order to make the purposes, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are some, but not all, of the embodiments of the present disclosure. Based on the embodiments in this disclosure, all other embodiments obtained by those skilled in the art without making creative efforts fall within the scope of protection of this disclosure.

Figure 1:
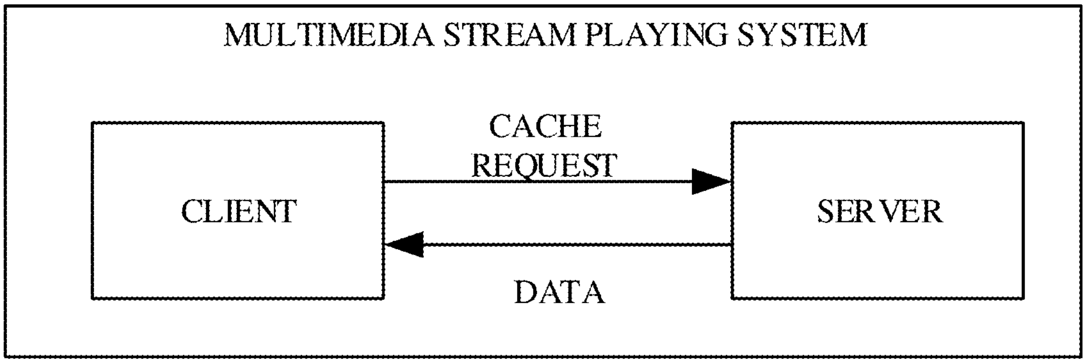
FIG. 1 is a schematic diagram of a play scene of a multimedia stream provided by an embodiment of the present disclosure.

The embodiments of the present disclosure are applied in the play scenario of multimedia streams. FIG. 1 is a schematic diagram of a play scene of a multimedia stream provided by an embodiment of the present disclosure. Referring to FIG. 1, a play process of the multimedia stream may be implemented by a multimedia stream playing system. The multimedia stream playing system may comprise a client and a server. Specifically, first, the client may transmit a cache request for a multimedia stream to the server; then, when receiving the cache request, the server obtains the corresponding data to return to the client; finally, when receiving the data transmitted by the server, the client plays the data.

It should be noted that, the cache request of the multimedia stream as mentioned above may be used for caching part or all of the data of one multimedia stream. For example, transmit the cache request before the multimedia stream starts playing, so as to cache part of the data of the multimedia stream; and transmit the cache request after the multimedia stream starts playing, so as to cache the remaining data of the multimedia stream.

While in practice, users may not play the entire multimedia stream after playing the multimedia data. In this case, the above caching strategy may result in the cache data not being used for play, resulting in a waste of network resources used for caching multimedia stream data.

In order to solve the above technical problems, embodiments of the present disclosure can control the caching of multimedia streams through a client. Specifically, display the cache control element in the player interface of the multimedia stream to cache the multimedia stream according to the user's operation on the cache control element. Users may control caching according to their own wishes. For example, when the user does not need to watch the remaining part of the multimedia stream, the user will not operate the cache control element, and then the remaining data of the multimedia stream will not be cached, which can save network resources used for caching the remaining data. Of course, when the user needs to watch the remaining part of the multimedia stream, the user can operate the cache control element to cache the remaining data to ensure the complete play of the multimedia stream.

The technical solutions of the embodiments of the present disclosure and how the technical solutions of the present disclosure solve the above technical problems will be described in detail below with specific embodiments. The following specific embodiments can be combined with each other, and the same or similar concepts or processes may not be described again in some embodiments. The embodiments of the present disclosure will be described below with reference to the drawings.

Figure 2:
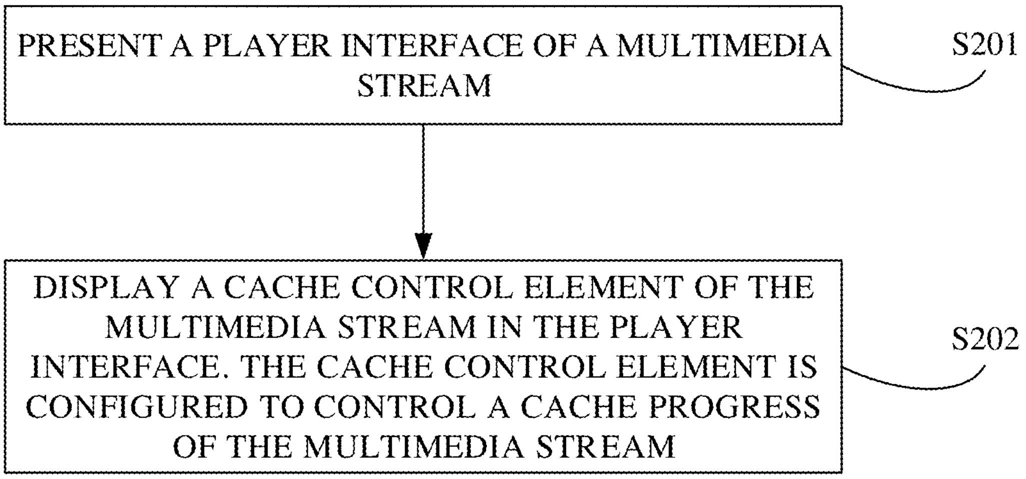
FIG. 2 is a step flowchart of a cache control method provided by an embodiment of the present disclosure.

Based on the play scene of the multimedia stream shown in FIG. 1 above, FIG. 2 is a step flowchart of a cache control method provided by an embodiment of the present disclosure. The cache control method of the embodiment of the present disclosure is executed by the client shown in FIG. 1. Referring to FIG. 2, the cache control method comprises:

S201: Present a player interface of a multimedia stream.

Wherein, the player interface is an interface for playing a multimedia stream, which may comprise one or more areas. Different areas have different functions. Some or all areas may comprise operation widgets to operate the multimedia stream. For example, referring to FIG. 3, the player interface A0 comprises a play area A1 and an operation area A2. The play area A1 is used for displaying the played multimedia stream, and the operation area A2 is used for displaying operation widgets for operating the multimedia stream. For example, the operation area A2 may comprise: a play progress bar B0 for controlling the play progress of the multimedia stream, a play control element B1, and a cache control element B2 newly added in the embodiment of the present disclosure for controlling the cache progress. In addition, the operation area may also comprise other operation widgets, for example, operation widgets for sharing the multimedia stream, operation widgets for commenting on the multimedia stream, etc.

It should be noted that there may be multiple display strategies for the player interface in the embodiment of the present disclosure.

In a first display strategy, the multimedia stream is not cached before the player interface is presented. When the player interface is presented, the play area in the player interface does not display the play content. For example, it can display blank, or display a default image, etc.

In a second display strategy, before displaying the player interface, the multimedia stream is cached in accordance to the preset cache size; then, the player interface is presented to play the multimedia stream, that is, the play content of the multimedia stream is displayed in the play area of the player interface.

It can be seen that the above second display strategy realizes caching and playing a preset cache size of the initial data of the multimedia stream. The caching process is performed before presenting the player interface, including but not limited to: caching during the process of playing previous multimedia streams, or caching during the process of starting the client.

In one example, for the first multimedia stream M1 played after starting the client, the multimedia stream M1 can be cached according to the above-mentioned preset cache size during the process of starting the client.

In another example, for the second and subsequent multimedia stream M2 played after starting the client, the multimedia stream M2 can be cached according to the above-mentioned preset cache size when playing the end part of the previous multimedia stream M3.

S202: Display a cache control element of the multimedia stream in the player interface. The cache control element is configured to control a cache progress of the multimedia stream.

Wherein, the cache control element can be any type of widget displayed at any position in the player interface. After the user operates it, the multimedia stream can be cached.

In one example, the cache operation widget may be a button displayed in the player interface. When the user clicks on it, complete data caching of the multimedia stream may be realized. In actual applications, multiple such buttons may be provided. Different buttons correspond to different cache sizes, or different operations on the same button represent different cache sizes.

In another example, the cache operation widget can also be a slider displayed on the cache progress bar. When the user slides the slider, the cache size of the multimedia stream can be adjusted according to the position of the slider on the cache progress bar.

Figure 3:
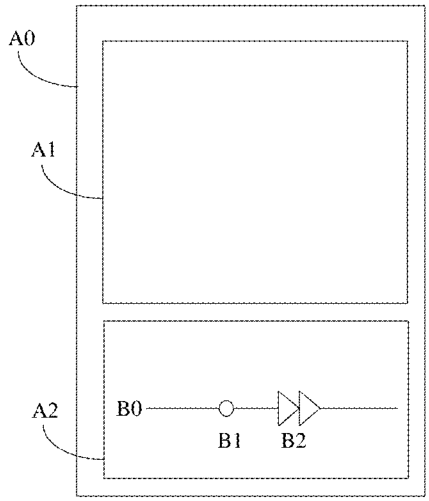
FIG. 3 is a schematic diagram of a player interface of a multimedia stream provided by an embodiment of the present disclosure.

The above cache progress bar may be another progress bar independent of the play progress bar B0 shown in FIG. 3, or may be the same progress bar as the play progress bar B0 shown in FIG. 3. When the cache progress bar and the play progress bar B0 are the same progress bar, the process of displaying the cache control element may comprise: displaying the play progress bar of the multimedia stream in the player interface. As shown in FIG. 3, the play progress bar B0 displays a play control element B1 and a cache control element B2. The play control element B1 is configured to control the play progress of the multimedia stream. The cache control element B2 is configured to control the cache progress of the multimedia stream.

It can be understood that, when the user slides the play control element B1, the play progress of the multimedia stream can be adjusted. When the user slides the cache control element B2, the cache progress of the multimedia stream can be adjusted. However, since the play content needs to be cached in advance, the cache control element B2 is located behind the play control element B1, or both are located at the same position.

In the embodiment of the present disclosure, the play control element B1 and the cache control element B2 can be displayed on the play progress bar at the same time, which can not only better reflect the relationship between playing and caching, but also save the display space of the player interface.

It should be noted that, when S201 caches multimedia streams in accordance to the preset cache size before presenting the player interface, the initial position of the cache control element at the play progress bar is used for indicating that the cached size of the multimedia data is the preset cache sizear, and the user's operation instruction on the cache control element adjust the cache control element from the preset cache size to the size of the multimedia stream. While, the initial position of the play control element at the play progress bar is the starting position of the play progress bar, which is 0 seconds, which means that the play starts from the starting position of the multimedia file.

For example, when the preset cache size is N seconds, the first N seconds of the multimedia stream have been cached before the player interface is presented. Therefore, when the player interface is presented, the initial position of the cache control element at the play progress bar corresponds to N seconds, and the user can adjust the cache control element between the end position of the N-second play progress bar. The end position of the play progress bar is used for indicating the size of the multimedia stream, such as M seconds, where M is greater than or equal to N.

When a cache control element is displayed on the above play progress bar, the user can operate the cache control element, and the client can receive the operation instructions for the above cache control element to cache the multimedia stream according to the operation instructions. Here, the operation instruction is used for adjusting the position of the cache control element on the play progress bar.

In the embodiment of the present disclosure, the types of the above operation instruction are different, and the corresponding cache sizes are different. Specifically, first, determine the type of the operation instruction; then, cache the multimedia stream according to the type of the operation instruction, and different types correspond to different cache sizes.

Wherein, the types of the operation instruction may comprise but are not limited to: click once, click twice, long press, slide, etc. The embodiment of the present disclosure does not limit the types of operation instruction and the relationship between types and cache sizes. For example, when the user clicks the cache control element twice, it may continue caching the multimedia stream for L seconds starting from the current cache size.

In a first example, when the type of the operation instruction is a first type, the complete multimedia data corresponding to the multimedia stream is cached. In this way, the user may cache and play the complete multimedia data in one operation, which may reduce the complexity of the user playing the complete multimedia stream. For example, when the first type is click once, the complete multimedia data corresponding to the multimedia stream is cached. Since the multimedia stream has been cached in accordance to the preset cache size before the player interface is presented, all data after the preset cache size of the multimedia stream may be cached.

In a second example, when the type of operation instruction is a second type, first, determine the position of the cache control element on the play progress bar after the operation instruction; then, determine the target cache size according to that position; finally, cache the multimedia stream according to the target cache size. In this way, users can flexibly adjust the cache progress.

In the embodiment of the present disclosure, the length of the play progress bar can be used to represent the size of the multimedia stream. Therefore, the position of the cache control element on the play progress bar is used to represent the current cache size. Specifically, current cache size=position on the play progress bar*size of the multimedia stream/length of the play progress bar. For example, when the second type is a sliding operation, the target cache size may be determined based on the position of the cache control element on the play progress bar after the sliding operation, so as to perform caching. That is, the data in the multimedia stream between the position before sliding and the position after sliding is cached. For example, before performing the second type of operation instruction, the position of the cache control element on the play progress bar corresponds to N seconds, and after sliding, the position of the cache control element on the play progress bar corresponds to K seconds. Then, the target cache size can be K−N seconds, which means that K−N seconds of data need to be cached starting from N seconds.

It can be understood that, regardless of whether the user operates the cache control element, the embodiment of the present disclosure can play the current cache data in a loop. Specifically, according to the position of the cache control element on the play progress bar, determine the current cache data in the multimedia data to play the current cache data in a loop.

When the user does not operate the above cache control element, the position of the cache control element on the play progress bar is the initial position corresponding to the above preset cache size. Therefore, it may realize playing part of the data of the preset cache size in the multimedia stream in a loop.

When the user slides the above cache operation widget to an intermediate position between the initial position and the end position on the play progress bar, it may realize playing the part before that intermediate position in the multimedia stream in a loop.

When the user slides the above cache operation widget to the end position on the play progress bar, it may realize playing all parts of the multimedia stream in a loop.

The embodiment of the present disclosure can realize playing part or all of a multimedia stream in a loop with the position of the cache control element, thereby improving the flexibility of the loop play of multimedia streams.

Figure 4:
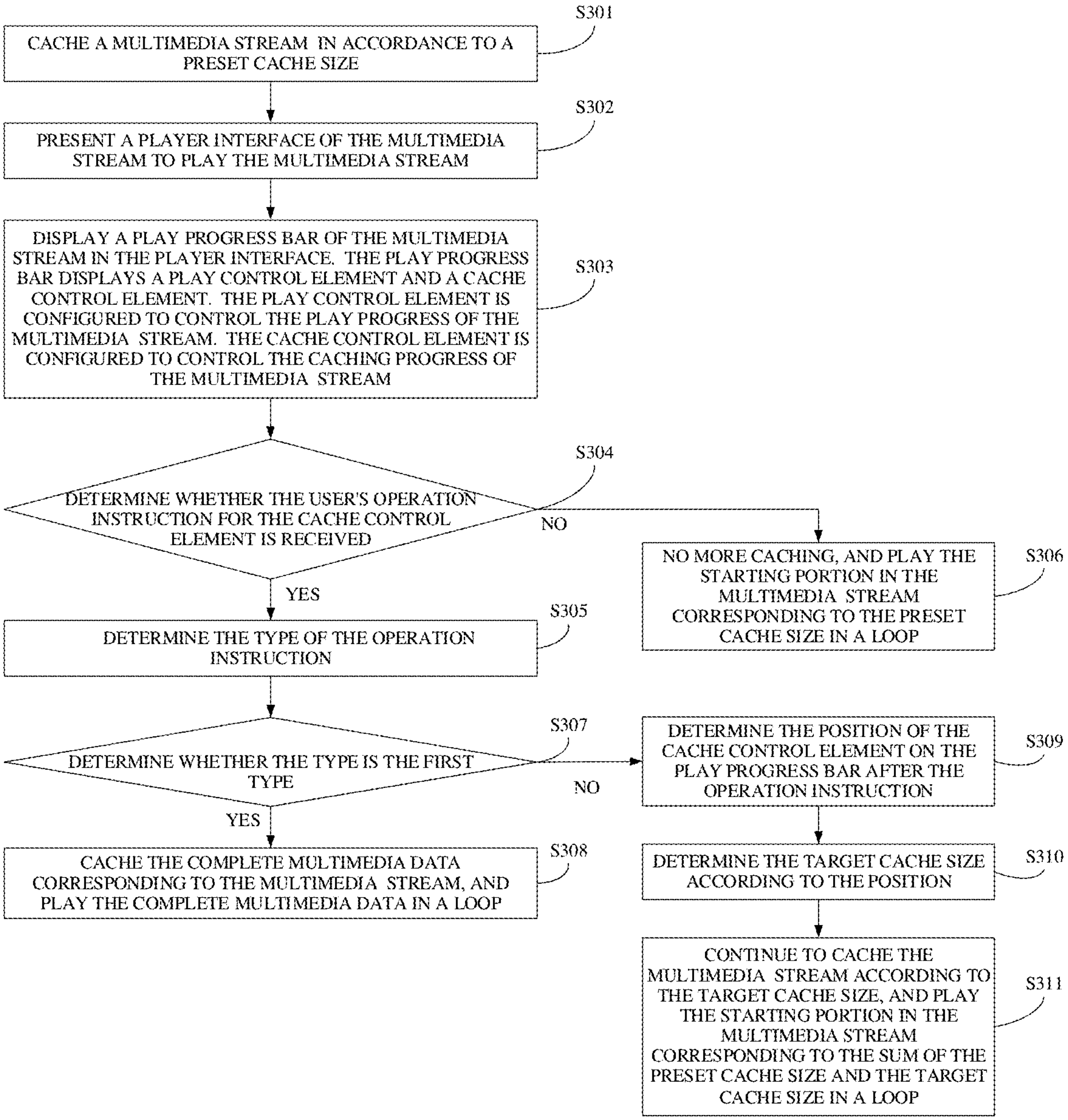
FIG. 4 is a detailed flowchart of a cache control method provided by an embodiment of the present disclosure.

FIG. 4 is a detailed flowchart of a cache control method provided by an embodiment of the present disclosure. Referring to FIG. 4, the above detailed flowchart comprises:

S301: Cache a multimedia stream in accordance to a preset cache size.

S302: Present a player interface of the multimedia stream to play the multimedia stream.

S303: Display a play progress bar of the multimedia stream in the player interface. The play progress bar displays a play control element and a cache control element. The play control element is configured to control the play progress of the multimedia stream. The cache control element is configured to control the cache progress of the multimedia stream.

S304: Determine whether the user's operation instruction for the cache control element is received. If yes, go to S305; if not, go to S306.

S305: Determine the type of the operation instruction.

S306: No more caching, and play the starting portion in the multimedia stream corresponding to the preset cache size in a loop.

S307: Determine whether the type is the first type. If yes, go to S308; if not, go to S309.

S308: Cache the complete multimedia data corresponding to the multimedia stream, and playing the complete multimedia data in a loop.

S309: Determine the position of the cache control element on the play progress bar after the operation instruction.

S310: Determine the target cache size according to the position.

S311: Continue to cache the multimedia stream according to the target cache size, and play the starting portion in the multimedia stream corresponding to the sum of the preset cache size and the target cache size in a loop.

It should be noted that, the above S301 to S311 in the embodiment of the present disclosure can be flexibly adjusted in order on a mutually independent basis, and the embodiment of the present disclosure does not place a limit on their order.

Figure 5:
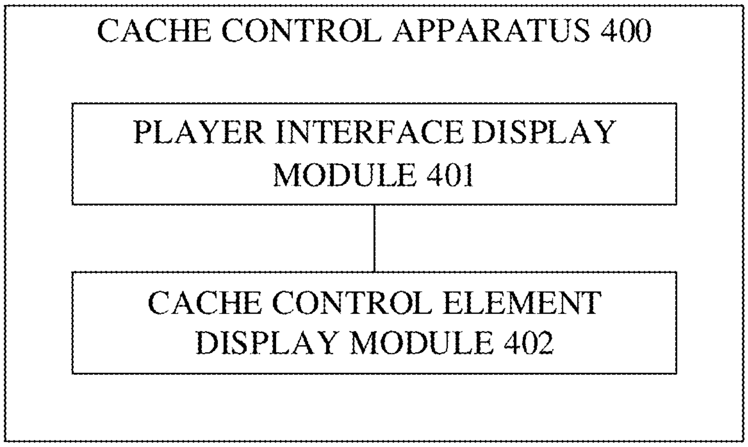
FIG. 5 is a structural block diagram of a cache control apparatus provided by an embodiment of the present disclosure.

Corresponding to the cache control method in the above embodiment, FIG. 5 is a structural block diagram of a cache control apparatus provided by an embodiment of the present disclosure. For convenience of explanation, only the parts related to the embodiments of the present disclosure are shown. Referring to FIG. 5, the above cache control apparatus 400 comprises:

A player interface display module 401, for presenting a player interface of a multimedia stream.

A cache control element display module 402, for displaying the cache control element of the multimedia stream in the player interface, wherein the cache control element is configured to control a cache progress of the multimedia stream.

Optionally, the cache control element display module 402 is used for:

Displaying a play progress bar of the multimedia stream in the player interface, wherein the play progress bar displays a play control element and the cache control element, and the play control element is configured to control a play progress of the multimedia stream.

Optionally, the apparatus further comprises:

An operation instruction receiving module, for receiving an operation instruction for the cache control element.

A control cache module, for caching the multimedia stream according to the operating instruction.

Optionally, the control cache module is also used for:

Determining a type of the operation instruction.

Caching the multimedia stream according to the type of the operation instruction, wherein different types correspond to different cache sizes.

Optionally, the control cache module is also used for:

Caching a complete multimedia data corresponding to the multimedia stream when the type of the operation instruction is a first type.

Optionally, the control cache module is also used for:

Determining a position of the cache control element on the play progress bar after the operation instruction when the type of the operation instruction is a second type;

Determining a target cache size according to the position.

Caching the multimedia stream according to the target cache size.

Optionally, the player interface display module 401 is also used for:

Caching the multimedia stream in accordance to a preset cache size, wherein an initial position of the cache control element on the play progress bar is used for indicating that the cached size of the multimedia data is the preset cache size, and an adjustment range of the operation instruction to the cache control element is from the preset cache size to the size of the multimedia stream;

Presenting the player interface to play the multimedia stream.

Optionally, the apparatus further comprises:

A current cache data determination module, for determining the current cache data in the multimedia data according to the position of the cache control element on the play progress bar.

A loop play module, for playing the current cached data in a loop.

The cache control apparatus provided in the embodiment can be used to execute the technical solution of the above method embodiment shown in FIG. 2. The implementation principles and technical effects are similar, and will not be described again in the embodiment.

Figure 6:
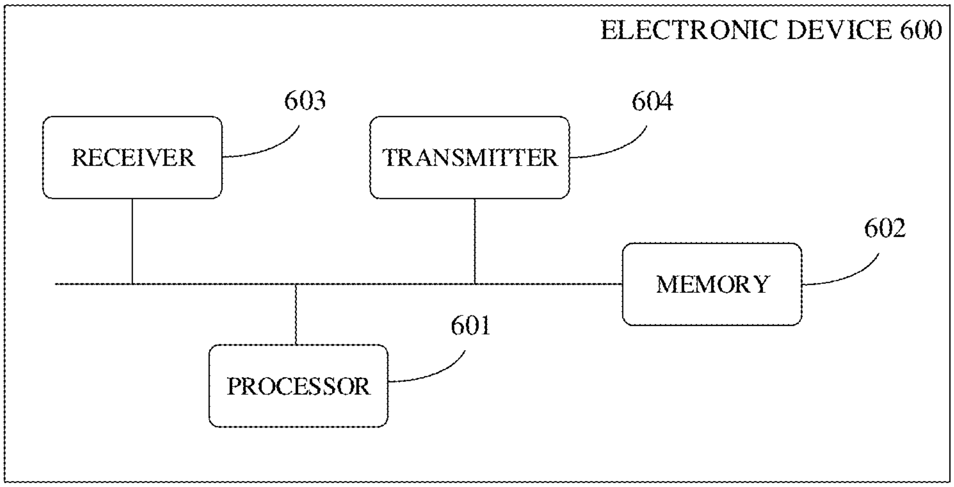
FIG. 6 is a structural block diagram of an electronic device provided by an embodiment of the present disclosure.

FIG. 6 is a structural block diagram of an electronic device provided by an embodiment of the present disclosure. The electronic device 600 comprises a memory 602 and at least one processor 601.

Wherein, the memory 602 stores computer executable instructions.

The at least one processor 601 executes computer executable instructions stored in the memory 602, causing the electronic device 600 to perform the afore-mentioned method in FIG. 2.

In addition, the electronic device may also comprise a receiver 603 and a transmitter 604. The receiver 603 is used for receiving information from other apparatuses or devices, and forwarding it to the processor 601. The transmitter 604 is used for transmitting information to other apparatuses or devices.

In a first example of the first aspect, an embodiment of the present disclosure provides a cache control method, the method comprises:

Presenting a player interface of a multimedia stream;

Displaying a cache control element of the multimedia stream in the player interface, wherein the cache control element is configured to control a cache progress of the multimedia stream.

Based on the first example of the first aspect, in a second example of the first aspect, displaying the cache control element of the multimedia stream in the player interface comprises:

Displaying a play progress bar of the multimedia stream in the player interface, wherein the play progress bar displays a play control element and the cache control element, and the play control element is configured to control a play progress of the multimedia stream.

Based on the second example of the first aspect, in a third example of the first aspect, the method further comprises:

Receiving an operation instruction for the cache control element; and

Caching the multimedia stream according to the operation instruction.

Based on the third example of the first aspect, in a fourth example of the first aspect, caching the multimedia stream according to the operation instruction comprises:

Determining a type of the operation instruction;

Caching the multimedia stream according to the type of the operation instruction, wherein different types correspond to different cache sizes.

Based on the fourth example of the first aspect, in a fifth example of the first aspect, caching the multimedia stream according to the type of the operation instruction comprises:

Caching a complete multimedia data corresponding to the multimedia stream when the type of the operation instruction is a first type.

Based on the fourth example of the first aspect, in a sixth example of the first aspect, caching the multimedia stream according to the type of the operation instruction comprises:

Determining a position of the cache control element on the play progress bar after the operation instruction when the type of the operation instruction is a second type;

Determining a target cache size according to the position;

Caching the multimedia stream according to the target cache size.

Based on the third example of the first aspect, in a seventh example of the first aspect, presenting the player interface of the multimedia stream comprises:

Caching the multimedia stream in accordance to a preset cache size, wherein an initial position of the cache control element on the play progress bar is used for indicating that the cached size of the multimedia data is the preset cache size, and an adjustment range of the operation instruction to the cache control element is from the preset cache size to the size of the multimedia stream;

Presenting the player interface to play the multimedia stream.

Based on the second to the seventh examples of the first aspect, in an eighth example of the first aspect, the method further comprises:

Determining a current cache data in the multimedia data according to the position of the cache control element on the play progress bar;

Playing the current cache data in a loop.

In a first example of the second aspect, a cache control apparatus is provided. The apparatus comprises:

A player interface display module, for presenting a player interface of a multimedia stream;

A cache control element display module, for displaying the cache control element of the multimedia stream in the player interface, wherein the cache control element is configured to control a cache progress of the multimedia stream.

Based on the first example of the second aspect, in a second example of the second aspect, the cache control element display module is also used for:

Displaying a play progress bar of the multimedia stream in the player interface, wherein the play progress bar displays a play control element and the cache control element, and the play control element is configured to control a play progress of the multimedia stream.

Based on the second example of the second aspect, in a third example of the second aspect, the apparatus further comprises:

An operation instruction receiving module, for receiving an operation instruction for the cache control element;

A control cache module, for caching the multimedia stream according to the operating instruction.

Based on the third example of the second aspect, in a fourth example of the second aspect, the control cache module is also used for:

Determining a type of the operation instruction;

Caching the multimedia stream according to the type of the operation instruction, wherein different types correspond to different cache sizes.

Based on the fourth example of the second aspect, in a fifth example of the second aspect, the control cache module is also used for:

Caching a complete multimedia data corresponding to the multimedia stream when the type of the operation instruction is a first type.

Based on the fourth example of the second aspect, in a sixth example of the second aspect, the control cache module is also used for:

Determining a position of the cache control element on the play progress bar after the operation instruction when the type of the operation instruction is a second type;

Determining a target cache size according to the position; and

Caching the multimedia stream according to the target cache size.

Based on the third example of the second aspect, in a seventh example of the second aspect, the player interface display module is also used for:

Caching the multimedia stream in accordance to a preset cache size, wherein an initial position of the cache control element on the play progress bar is used for indicating that the cached size of the multimedia data is the preset cache size, and an adjustment range of the operation instruction to the cache control element is from the preset cache size to the size of the multimedia stream;

Presenting the player interface to play the multimedia stream.

Based on the second to the seventh examples of the second aspect, in an eighth example of the second aspect, the apparatus further comprises:

A current cache data determination module, for determining the current cache data in the multimedia data according to the position of the cache control element on the play progress bar.

A loop play module, for playing the current cached data in a loop.

In a third aspect, according to one or more embodiments of the present disclosure, an electronic device is provided, comprising at least one processor and a memory.

The memory stores computer executable instructions.

The at least one processor executes the computer executable instructions stored in the memory, causing the electronic device to perform the method as described in any one of the first aspect.

In a fourth aspect, according to one or more embodiments of the present disclosure, a non-transitory computer-readable storage medium is provided. The non-transitory computer-readable storage medium stores computer executable instructions. When the processor executes the computer executable instruction, cause the computing device to perform the method described in any one of the first aspects.

In a fifth aspect, according to one or more embodiments of the present disclosure, a computer program is provided. The computer program is used to perform the method according to any one of the first aspect.

The above description is only a description of the preferred embodiments of the present disclosure and the technical principles applied. Those skilled in the art should understand that the disclosure scope involved in the present disclosure is not limited to technical solutions formed by specific combinations of the above technical features, but should also cover other technical solutions may be formed by any combination of the above technical features or their equivalent features without departing from the above disclosed concept. For example, a technical solution is formed by replacing the above features with (but not limited to) technical features with similar functions disclosed in this disclosure.

Furthermore, although operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A cache control method, comprising:

presenting a player interface of a multimedia stream; and displaying a play progress bar of the multimedia stream in the player interface, wherein the play progress bar displays a play control element and a cache control element of the multimedia stream, the play control element is configured to control a play progress of the multimedia stream, the cache control element is configured to control a cache progress of the multimedia stream, and the play progress and the cache progress are independent of each other.

2. The method of claim 1, wherein the method further comprises:

receiving an operation instruction for the cache control element; and caching the multimedia stream according to the operation instruction.

3. The method of claim 2, wherein caching the multimedia stream according to the operation instruction comprises:

determining a type of the operation instruction; and caching the multimedia stream according to the type of the operation instruction, wherein different types correspond to different cache sizes.

4. The method of claim 3, wherein caching the multimedia stream according to the type of the operation instruction comprises:

caching a complete multimedia data corresponding to the multimedia stream when the type of the operation instruction is a first type.

5. The method of claim 3, wherein caching the multimedia stream according to the type of the operation instruction comprises:

determining a position of the cache control element on the play progress bar after the operation instruction when the type of the operation instruction is a second type;

determining a target cache size according to the position; and caching the multimedia stream according to the target cache size.

6. The method of claim 2, wherein presenting the player interface of the multimedia stream comprises:

caching the multimedia stream in accordance to a preset cache size, wherein an initial position of the cache control element on the play progress bar is used for indicating that a cached size of the multimedia data is the preset cache size, and an adjustment range of the operation instruction to the cache control element is from the preset cache size to the size of the multimedia stream; and presenting the player interface to play the multimedia stream.

7. The method of claim 1, wherein the method further comprises:

determining a current cache data in the multimedia data according to the position of the cache control element on the play progress bar; and playing the current cache data in a loop.

8. An electronic device, comprising: at least one processor and a memory, wherein, the memory stores computer executable instructions; and the at least one processor executes the computer executable instructions stored in the memory, causing the electronic device to:

present a player interface of a multimedia stream; and display a play progress bar of the multimedia stream in the player interface, wherein the play progress bar displays a play control element and a cache control element of the multimedia stream, the play control element is configured to control a play progress of the multimedia stream, the cache control element is configured to control a cache progress of the multimedia stream, and the play progress and the cache progress are independent of each other.

9. The electronic device of claim 8, wherein the electronic device is further caused to:

receive an operation instruction for the cache control element; and cache the multimedia stream according to the operation instruction.

10. The electronic device of claim 9, wherein the electronic device being caused to cache the multimedia stream according to the operation instruction comprises being caused to:

determine a type of the operation instruction; and cache the multimedia stream according to the type of the operation instruction, wherein different types correspond to different cache sizes.

11. The electronic device of claim 10, wherein the electronic device being caused to cache the multimedia stream according to the type of the operation instruction comprises being caused to:

cache a complete multimedia data corresponding to the multimedia stream when the type of the operation instruction is a first type.

12. The electronic device of claim 10, wherein the electronic device being caused to cache the multimedia stream according to the type of the operation instruction comprises being caused to:

determine a position of the cache control element on the play progress bar after the operation instruction when the type of the operation instruction is a second type;

determine a target cache size according to the position; and caching the multimedia stream according to the target cache size.

13. The electronic device of claim 9, wherein the electronic device being caused to present the player interface of the multimedia stream comprises being caused to:

cache the multimedia stream in accordance to a preset cache size, wherein an initial position of the cache control element on the play progress bar is used for indicating that a cached size of the multimedia data is the preset cache size, and an adjustment range of the operation instruction to the cache control element is from the preset cache size to the size of the multimedia stream; and present the player interface to play the multimedia stream.

14. The electronic device of claim 8, wherein the electronic device is further caused to:

determine a current cache data in the multimedia data according to the position of the cache control element on the play progress bar; and play the current cache data in a loop.

15. A non-transitory computer-readable storage medium, wherein the non-transitory computer-readable storage medium stores computer executable instructions, and when a processor executes the computer executable instructions, cause a computing device to:

present a player interface of a multimedia stream; and display a play progress bar of the multimedia stream in the player interface, wherein the play progress bar displays a play control element and a cache control element of the multimedia stream, the play control element is configured to control a play progress of the multimedia stream, the cache control element is configured to control a cache progress of the multimedia stream, and the play progress and the cache progress are independent of each other.

16. The non-transitory computer-readable storage medium of claim 15, wherein the electronic device is further caused to:

receive an operation instruction for the cache control element; and cache the multimedia stream according to the operation instruction.

17. The non-transitory computer-readable storage medium of claim 16, wherein the computing device being caused to cache the multimedia stream according to the operation instruction comprises being caused to:

determine a type of the operation instruction; and cache the multimedia stream according to the type of the operation instruction, wherein different types correspond to different cache sizes.

* * * * *